United States Patent [19]

Odaka

[11] Patent Number: 4,549,230
[45] Date of Patent: Oct. 22, 1985

[54] REDUNDANTLY AND ASYNCHRONOUSLY RECORDING AN INFORMATION SIGNAL

[75] Inventor: Kentaro Odaka, Kawasaki, Japan

[73] Assignee: Sony Corporation, Tokyo, Japan

[21] Appl. No.: 564,891

[22] Filed: Dec. 23, 1983

[30] Foreign Application Priority Data

Dec. 29, 1982 [JP] Japan .................................. 57-233194

[51] Int. Cl.⁴ .......................... G11B 5/00; G11B 15/02
[52] U.S. Cl. .......................................... 360/8; 360/18; 360/24; 360/32
[58] Field of Search ...................... 360/8, 9, 18, 24, 32, 360/47

[56] References Cited

U.S. PATENT DOCUMENTS

| | | |
|---|---|---|
| 4,224,642 | 9/1980 | Mawatari et al. ...................... 360/47 |
| 4,227,221 | 10/1980 | Kanazawa ............................. 360/24 |
| 4,328,580 | 5/1982 | Stockman, Jr. et al. ............. 360/47 |
| 4,446,490 | 5/1984 | Hoshina et al. ...................... 360/32 |
| 4,463,387 | 7/1984 | Hashimoto et al. ................. 360/32 |
| 4,477,844 | 10/1984 | Nakano et al. ........................ 360/8 |

Primary Examiner—Vincent P. Canney

Attorney, Agent, or Firm—Lewis H. Eslinger; Alvin Sinderbrand

[57] ABSTRACT

In recording an analog signal using two recording heads equally-spaced on a rotating drum, a magnetic tape is wrapped about a guide drum over an angular extent of 90°, so that there are recording periods when a head is tracing the tape and periods when no head is tracing the tape. The analog signal to be recorded is converted to a pulse-code-modulated (PCM) digital signal in real-time periods which are longer than the recording periods during which a head traces the tape. The PCM signals are time-base compressed to be slightly less than the rotary head contact interval and additional data such as parity data and cyclic redundancy check codes are added to the PCM signals to form a composite signal, which is written back into a memory system. The time-base compressed composite signal is then read out repeatedly from the memory over one contact interval and supplied to the recording heads so that in the tracks formed by the heads on the tape the composite data appears more than once in each track, that is, slightly overlapped, thereby preventing dropouts and permitting the signal to be recorded on the tape by the head without accurately detecting the rotary phase of the recording head.

16 Claims, 47 Drawing Figures

REDUNDANTLY AND ASYNCHRONOUSLY RECORDING AN INFORMATION SIGNAL

BACKGROUND OF THE INVENTION

1. Field of the Invention

The present invention relates in general to a method and apparatus for recording an information signal on a magnetic medium and, more particularly, to a method and apparatus for recording an information signal on a magnetic tape using one or more rotary heads.

2. Description of the Prior Art

It has become standard practice in a video recorder to record an information signal on a magnetic tape by means of a rotary head as a series of parallel tracks that are obliquely arranged in relation to the direction of travel of the tape. It is also known that in order to record properly the signal in these slanted tracks the recording signal must have a predetermined phase relationship relative to the rotational phase of the rotary head. Otherwise, signals might be supplied on the recording head when it was not in contact with the tape and dropouts would occur. Typically, a separate reference signal must be provided to indicate the rotational phase of the rotary head.

In U.S. patent application Ser. No. 06/485,065, filed Apr. 4, 1983, commonly assigned herewith, it has been proposed that when a pulse-code-modulated (PCM) signal is to be recorded, the rotary head is controlled so that it comes into contact with the tape during the exact time that the PCM signal is read out of a memory. To accomplish this synchronized recording operation, the timing control of the rotary head is carried out by taking a signal representative of the rotational phase of the rotary head as a reference. One way of obtaining an appropriate reference signal indicating the rotational phase of the rotary head is to employ a pulsed signal PG, which is obtained from a pulse generator formed by a combination of a magnet and a detecting coil, with both of these elements being located within the rotary head drum. This system adequately provides the necessary reference signal having head-position pulses therein. However, the pulse generator apparatus must be disposed within the circumference of the rotary head drum. This becomes a problem when it is desired to reduce the diameter of the drum in order to reduce the size of the overall rotary head and tape-guide drum assembly, for example, when embodying the apparatus as a portable video camera. Thus, the space required for the pulse generator becomes a limiting factor because the diameter of the rotary head drum can not be reduced, since space must be left to mount the magnet and detecting coil therewithin.

Not only does this pulse generator structure place a limitation on the minimum diameter of the tape-guide drum but its requirement adds to the construction costs and complexity of the entire rotary head drum assembly. Moreover, the accuracy with which these pulses must be generated requires critical adjustments between the head mounting position and the mounting position of the pulse generator and, thus, such adjustments become both troublesome and time consuming.

OBJECTS AND SUMMARY OF THE INVENTION

Accordingly, it is an object of the present invention to provide an improved method and apparatus for recording an information signal on a recording medium utilizing a rotary magnetic head, which can eliminate the above-noted defects inherent in the prior art.

Another object of the present invention is to provide a method and apparatus for recording an information signal on a record medium with a rotary head without requiring accurate detection of the rotational phase of the rotary head relative to the phase of the signal to be recorded.

In one aspect of the present invention, a method is provided to record an analog information signal on a magnetic record medium using a rotary head involving the steps of converting the analog information signal into a digital signal and then tracing the magnetic record medium with the rotary heads to provide at least one recording period during each predetermined real-time signal period, in which the duration of the recording period is less than the duration of the real-time signal period. Address data is periodically added to the digital information signal to provide a composite digital signal and then the time base of the composite digital signal is compressed to be substantially equal to the time of the recording period. These time-base compressed composite digital signals are then repeatedly or sequentially supplied to the rotary magnetic head for recording as a series of parallel, oblique tracks along the magnetic tape.

The data being recorded as one segment is compressed in time base to a period slightly shorter than the period of contact between the tape and the head. This results in a partial overlap of the data in each track, thereby precluding any dropouts.

The above, and other objects, features, and advantages of the present invention will become apparent from the following detailed description of illustrated embodiments, which is to be read in connection with the accompanying drawings, in which the same reference numerals identify corresponding elements and parts in the several views.

BRIEF DESCRIPTION OF THE DRAWINGS

FIGS. 4A to 4R-II are timing charts illustrating the operation of the recording apparatus of FIG. 3;

FIGS. 7A to 7H are timing charts useful in explaining the operation of the system of FIG. 6.

DESCRIPTION OF PREFERRED EMBODIMENTS

Figure 1:
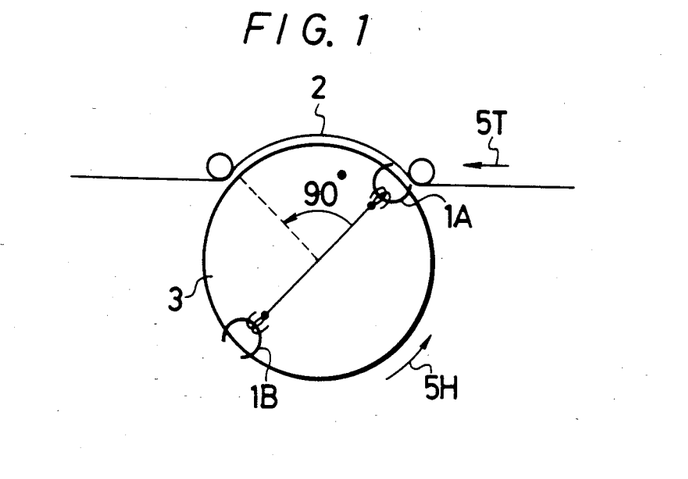
FIG. 1 is a schematic representation of a rotary head assembly used in the method and apparatus for recording an information signal according to the present invention.
Figure 2:
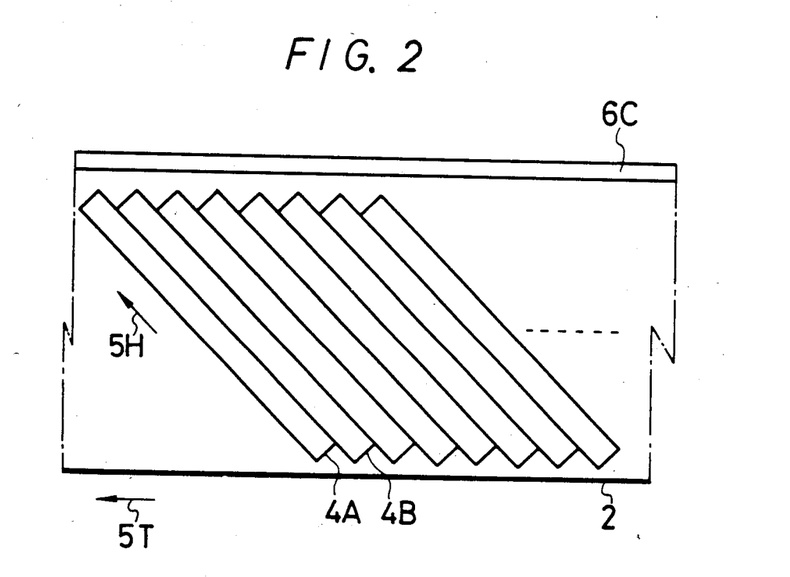
FIG. 2 is a representation of the orientation of tracks recorded on a tape using the rotary head assembly shown in FIG. 1.

FIG. 1 schematically represents a rotary magnetic head assembly suitable for use in the present invention, which includes two magnetic heads 1A and 1B that are mounted on a rotating drum, not shown, so as to be diametrically opposed, with an angular separation of 180°. A suitable magnetic medium, such as magnetic tape 2, is wrapped around the peripheral surface of tape guide drum 3 with a circumferential angle of approximately 90°. A rotary head assembly similar to this is disclosed in the above-mentioned U.S. patent application, Ser. No. 06/485,065 filed Apr. 4, 1983 and assigned to a common assignee herewith. Typically, rotary heads 1A and 1B are rotated at a rate of 30 revolutions per second in the direction of arrow 5H, thereby defining a "scanning period" of the rotating drum of 1/30 of a second. Magnetic tape 2 is transported at a predetermined linear speed in the direction shown by arrow 5T, so that in the recording operation the moving tape and rotary heads form a series of parallel, slanted tracks on the magnetic tape 2, as represented typically at 4A and 4B in FIG. 2. Rotary heads 1A and 1B cooperating with the magnetic tape 2 can record substantially any kind of electrical signal, and in this embodiment a pulse-code-modulated (PCM) signal is to be recorded on magnetic tape 2. The successive slanted tracks 4A and 4B are arranged on the tape adjacent each other in a high-density fashion with no spaces or guard bands therebetween, and this can be accomplished by the known practice of providing heads 1A and 1B with gaps that have different azimuth angles. This technique reduces cross-talk between adjacent tracks during reproduction by taking advantage of the so-called azimuth loss phenomenon.

From FIG. 1 it can be seen that during operation there will be a period of time when both of the two rotary heads 1A and 1B are out of contact with tape 2 and in this embodiment such period would correspond to an angular extent of 90°. The present invention utilizes these noncontact or free periods to add additional digital data, such as parity data and error correction codes, to the PCM data representing the information signal to be recorded.

Figure 3:
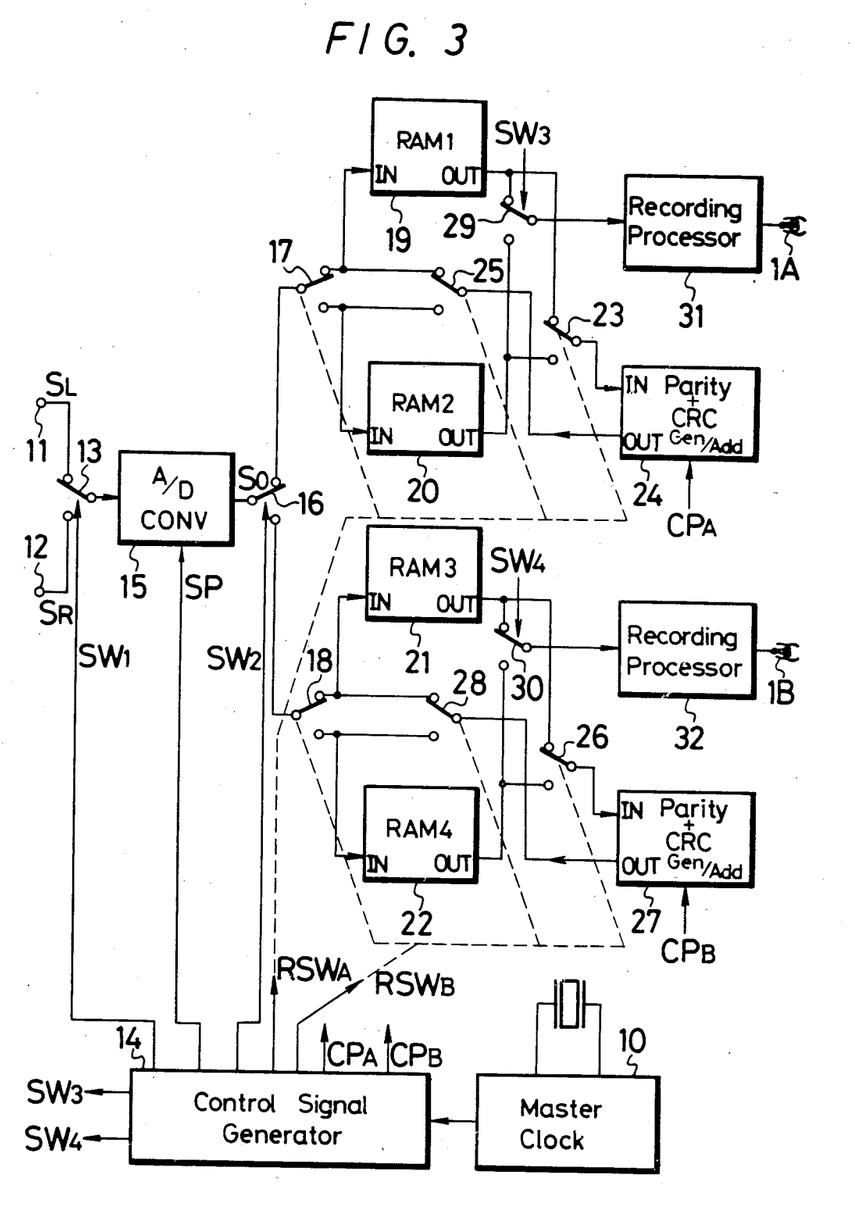
FIG. 3 is a block diagram illustrating a preferred embodiment of apparatus for recording an information signal according to the present invention.
Figure 4A:
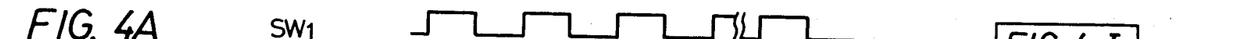
Figure 4B:
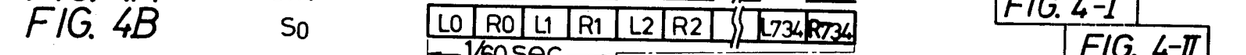
Figures 1, 4C:
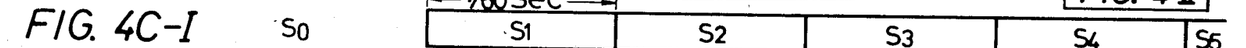
Figures 2, 4C:
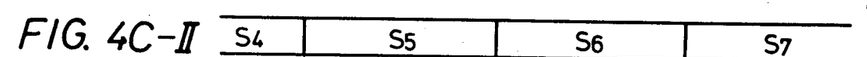

In the embodiment of the present invention shown in FIG. 3, an analog audio signal is supplied as two signals representing left and right stereo audio channels. A left-channel audio signal $S_L$ is supplied through input terminal 11 to one input of switching circuit 13, while a right-channel audio signal $S_R$ is supplied through input terminal 12 to the other input terminal of switching circuit 13. Switching circuit 13 is alternately changed over by a switching signal $SW_1$ produced by control signal generating circuit 14, and the output from switching circuit 13 is fed to an input of analog-to-digital converter (A/D) 15. Analog-to-digital converter 15 samples the input analog signal under control of a sampling signal SP produced by the control signal generating circuit 14, which also generates other control signals described hereinbelow that are derived from a master clock signal provided by master clock circuit 10. The switching signal $SW_1$ that controls the operation of switching circuit 13 has the same frequency as the sampling signal SP used to control A/D convertor 15, for example, 44.1 kHz. As shown in FIG. 4A, switching signal $SW_1$ is a square-wave signal having 50% duty factor and when the switching signal $SW_1$ is high, switching circuit 13 selects the left-channel audio signal $S_L$ and when the switching signal $SW_1$ is low, switching circuit 13 is changed over to select the right-channel audio signal $S_R$. This permits switching circuit 13, under control of signal $SW_1$, to alternately select the inputs to form a single output signal, as represented in FIG. 4B.

Figures 1, 4D:
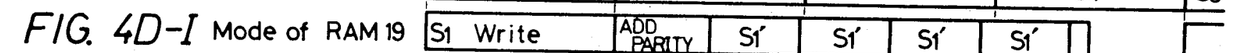
Figures 2, 4D:
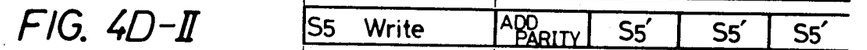
Figures 1, 4E:
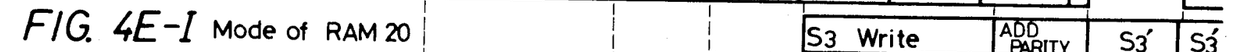
Figures 2, 4E:
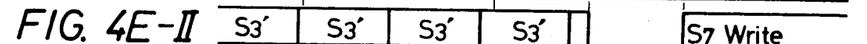
Figures 1, 4F:
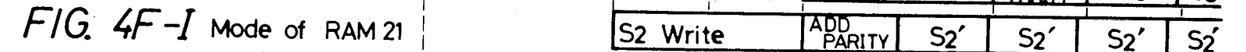
Figures 2, 4F, 4G:
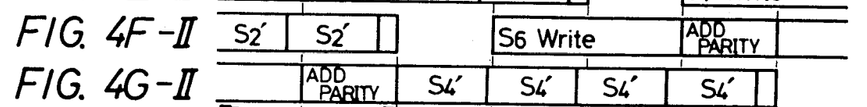
Figures 1, 4G, 4H, 4I:
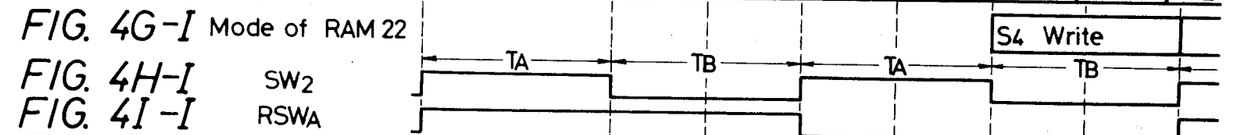
Figures 2, 4H:
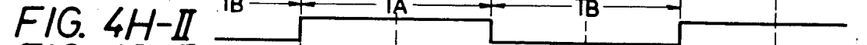
Figures 2, 4I:
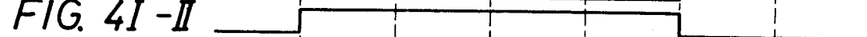

The sampling signal SP from control signal generator circuit 14 controls the sampling frequency (44.1 kHz) of the A/D convertor 15 so that the combined left-channel and right-channel audio signals from switch 13 are sampled respectively, and the data thus sampled is converted to a pulse-code-modulated (PCM) signal $S_0$ of, for example, 16 bits per word. FIG. 4B shows the output signal $S_0$ from A/D converter 15 in which $L_0$, $L_1$, $L_2$, . . . represent single words of the left-channel audio PCM signal, while $R_0$, $R_1$, $R_2$, . . . represent single words of the right-channel audio PCM signal. The output signal $S_0$ from A/D convertor 15 is fed through switching circuits 16, 17, and 18 to the respective inputs of a first random access memory unit 19 (RAM1), a second random access memory unit (RAM2) 20, a third random access memory unit (RAM3) 21, and a fourth random access memory unit (RAM4) 22. As will be explained hereinbelow, these four random access memory units operate to provide redundant data addition, interleave processing, and time-base compression of the digitized audio signals. Switching circuit 16, which receives the digitized audio signal $S_0$, is changed over in response to switching signal $SW_2$, which is produced by control signal generator 14 and in this embodiment has a frequency of approximately 30 Hz, the waveform of which is shown in FIG. 4H. During the 1/60 of a second time period $T_A$ within which the switching signal $SW_2$ is high, every other signal $S_1$, $S_3$, $S_5$ . . . is fed to switching circuit 17, whereas during the 1/60 of a second time period $T_B$ during which the switching signal $SW_2$ is low, the remaining signals $S_2$, $S_4$, $S_6$ . . . are fed to switching circuit 18.

Switching circuit 17 is changed over in response to signal $RSW_A$, the waveform of which is shown in FIG. 4I and which is provided by dividing the frequency of the switch control signal $SW_2$ by one half, so that among the signals $S_1$, $S_3$, $S_5$ . . . that are fed to the input of switching circuit 17 every other signal will be written into the first RAM 19, for example, $S_1$, $S_5$, $S_9$, . . . whereas the remaining signals $S_3$, $S_7$, $S_{11}$ . . . will be written into the second RAM 20. The relationship between these signals is represented in FIGS. 4D and 4E.

Figures 1, 4J:
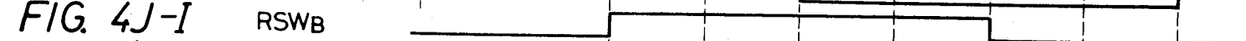
Figures 2, 4J:
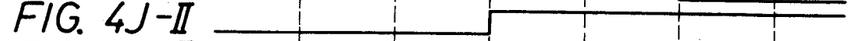

On the other hand, switching circuit 18 operates to distribute alternate signals between the third RAM 21 and the fourth RAM 22. Specifically, switching circuit 18 is changed over in position in response to signal $RSW_B$, the waveform of which is shown in FIG. 4J, and which is obtained by delaying signal $RSW_A$ by $\pi/2$, so that among the signals $S_2$, $S_4$, $S_6$ . . . that are fed to switching circuit 18, every other signal $S_2$, $S_6$, $S_{10}$ . . . is written into the third RAM 21, whereas the remaining signals $S_4$, $S_8$, $S_{12}$ . . . are written into the fourth RAM 22. The relationship among these signals is represented in FIGS. 4F and 4G. In this fashion, pulse-code-modulated audio data having a period of 1/60 of a second are alternately written into the four RAMs 19, 20, 21, and 22 and, in this embodiment, based upon the sampling frequencies described above, there are 1,470 samples contained within the 1/60 of a second period. More specifically, as shown in FIG. 4B, there are 735 words, comprising words $L_0$ to $L_{734}$, for the left-channel audio signal and there are 735 words, comprising words $R_0$ to $R_{734}$, for the right-channel audio signal, thereby providing a total number of 1,470 words.

During the first half portions of periods $T_A$ and $T_B$, parity words and cyclic redundancy check (CRC) codes are added to the PCM data words that have been written into the four RAMs 19, 20, 21, and 22. Specifically, the output signals from the first and second RAMs, 19, 20 are respectively selectively supplied through switching circuit 23 to a first parity word and CRC code generating and adding circuit 24. Similarly, the output signals from the third and fourth RAMs 21, 22 are respectively, selectively supplied through switching circuit 26 to a second parity word and CRC code generating and adding circuit 27. After the parity words and CRC codes have been added to the data input to the first parity word and CRC code generating and adding circuit 24, the composite data is fed back through switch 25 to be distributed between first and second RAMs 19 and 20, respectively. Similarly, after the parity words and CRC codes have been added to the data input to the second parity word and CRC code generating and adding circuit 27, the composite data is fed back through switching circuit 28 to be distributed between the third and fourth RAMs 21 and 222, respectively.

Figures 1, 4K:
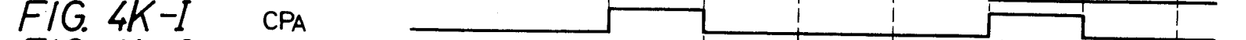
Figures 2, 4K:
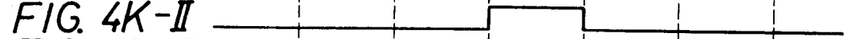
Figures 1, 4L:
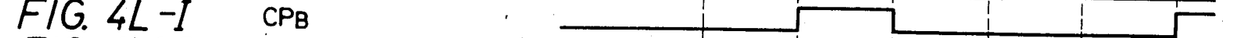
Figures 2, 4L:
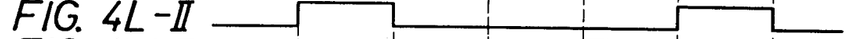

Switches 23 and 25 that distribute the data back among the first and second RAMs 19 and 20, respectively, are changed over in synchronism with switching circuit 17 under control of switching signal $RSW_A$, whereas switches 26 and 28 that distribute the data words back among third and fourth RAMs 21 and 22, respectively, are changed over in synchronism with switching circuit 18 under control of switching signal $RSW_B$. Control signal generator 14 generates a further control signal $CP_A$, which has a square waveform, and which has a high level during the first 1/120 of a second portion of period $T_B$, as represented in FIG. 4K, and control signal $CP_A$ is supplied to parity word and CRC code generating and adding circuit 24. Similarly, control signal $CP_B$ is generated by control signal generator 14 and has a square waveform having a high signal level during the first 1/120 of a second portion of period $T_A$, as represented in FIG. 4L, and control signal $CP_B$ is supplied to parity word and CRC code generating and adding circuit 27. Accordingly, during the times when control signals $CP_A$ and $CP_B$ are both at a high level, the parity words and the CRC codes are generated and added to the PCM data alternately fed out of the four RAMs 19, 20, 21, and 22.

The data that is written into first RAM 19 during every other one of periods $T_A$ is supplied through switching circuit 23 to the parity word and CRC code generating and adding circuit 24 in the preceding period $T_B$. Similarly, in the parity word and CRC code generating and adding circuit 24, since the control signal $CP_A$ is high during the first-half of period $T_B$, at that time the parity word and CRC code are generated for the input data, the parity word and CRC code are added to the input data, and the composite data is then rewritten back into first RAM 19 at the original position thereof through action of switching circuit 25. This same operation is performed in relation to second RAM 20, specifically, the data stored in second RAM 20 during the remaining every other one of periods $T_A$ is supplied through switching circuit 23 to the parity word and CRC code generating and adding circuit 24. Then, during the first half of the subsequent period $T_B$, when control signal $CP_A$ is high, the parity word and CRC code are generated in the generating and adding circuit 24 and added to the data, and the composite data are rewritten back into second RAM 20, at the same address locations.

In this same fashion, the data written into third RAM 21 during every other one of periods $T_B$, and the data written into fourth RAM 22, during the remaining every other ones of such periods $T_B$ are respectively added with the parity word and CRC code during the first-half of the subsequent period $T_A$, just as described above in regard to first and second RAMs 19 and 20. Thus, RAMs 21 and 22 have written therein composite PCM data which have added thereto appropriate parity words and CRC codes.

Figures 5, 6:
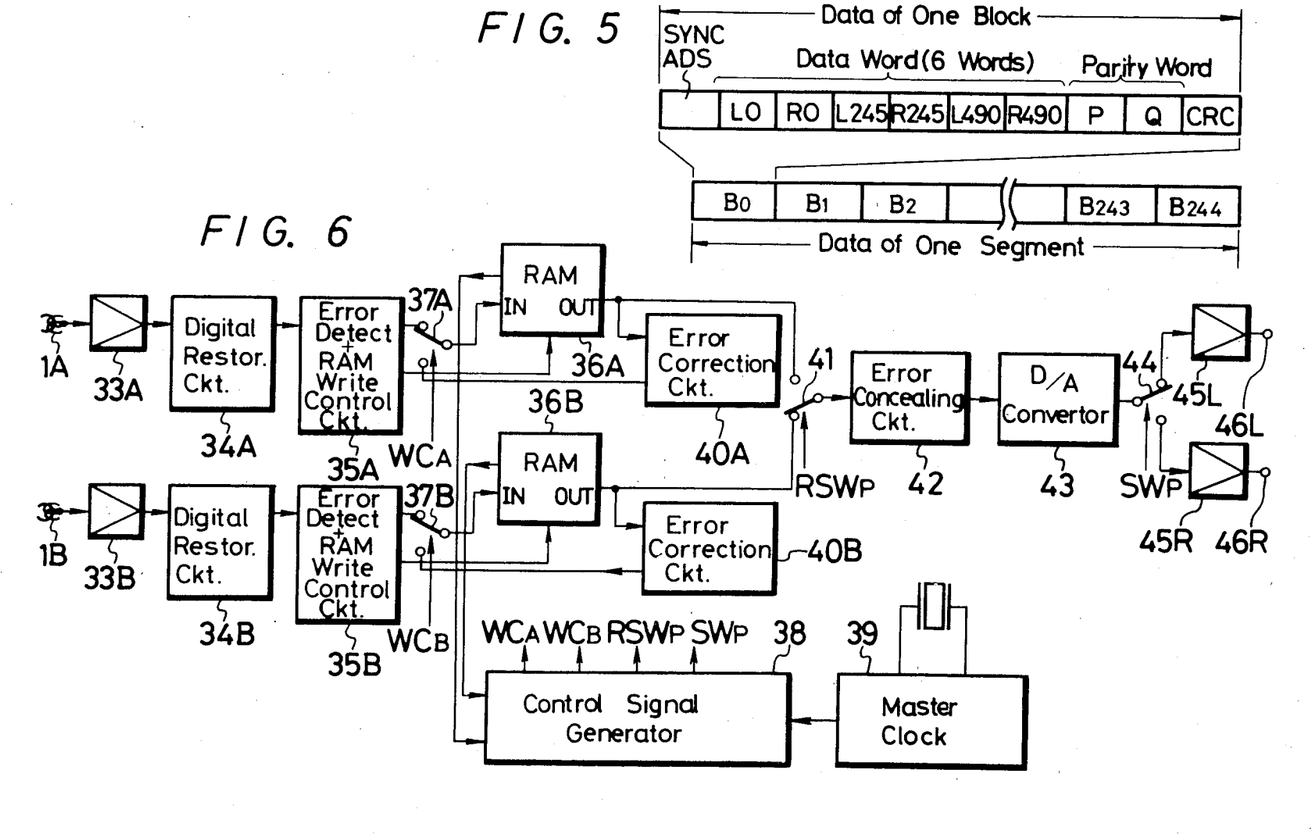
FIG. 5 is a representation of a block of record data showing the format thereof.
FIG. 6 is a block diagram representing another embodiment of apparatus for recording an information signal according to the present invention.

When the parity word and the CRC code are generated and added to the PCM data, the PCM data is arranged into blocks of six words each and the parity data P and Q and the CRC code are added to such PCM data of six words as shown in FIG. 5. As further shown in FIG. 5, the data of six words in length is subjected to interleaving processing within the PCM data amount of 1/60 of a second, which is accomplished by controlling the read addresses of the four RAMs 19, 20, 21, and 22 as one track, as will be described hereinbelow.

The composite PCM data signals, which are the original PCM audio signals with the parity words and the CRC code added thereto, are read out from the four RAMs 19, 20, 21, and 22 in such a fashion that the respective time bases are compressed substantially to an amount corresponding to the duration of contact of the rotary heads 1A and 1B with magnetic tape 2, specifically, time-base compression is approximately one-half of the original time base. Thus, the time-base compressed signals having the parity words and CRC code words added thereto are repeatedly read out from the four RAMs 19, 20, 21, 22 during a period of one revolution of the rotary head and are fed through recording processors 31, 32 to rotary heads 1A and 1B, respectively. In other words the output signals from first and second RAMs 19 and 20 are selectively switched by switching circuit 29 under control of switching signal $SW_3$ and supplied through recording processor 31 to recording head 1A. Similarly, output signals from third and fourth RAMs 21 and 22 are selectively switched by switching circuit 30 under control of switching signal $SW_4$ and fed through recording processor 32 to recording head 1B.

Figures 1, 4M:
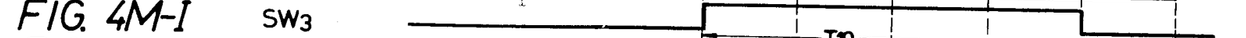
Figures 2, 4M:
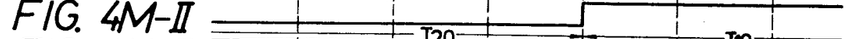

The waveform of switching signal $SW_3$, shown in FIG. 4M, inverts its state each time the parity word and CRC code processing has ended in RAMs 19 and 20 and is produced by control signal generator 14 and fed to switching circuit 29, so that switching circuit 29 is changed over in position to the first RAM 19 side while signal $SW_3$ is high during period $T_{19}$ and switching circuit 29 is changed over to select the output signals from second RAM 20 when switching signal $SW_3$ is low during period $T_{20}$. The first and second RAMs 19, 20 are respectively set in the read out mode during periods $T_{19}$ and $T_{20}$ so that they are read out at a speed slightly higher than two times the write-in speed. That is, in this embodiment, the PCM data corresponding to the original period of 1/60 of a second duration, which is added with the error correction data such as the parity words and CRC code, is compressed in time base to a duration somewhat shorter than the head-tape contact period of 1/120 of a second. Thus, data $S_1'$, $S_3'$ . . . each having a compressed time-base are read out four times or more from RAMS 19 and 20 during the read periods $T_{19}$ and $T_{20}$ (compare FIGS. 4D and 4E with FIG. 4M), and such read out data are then delivered through recording processor 31 to rotary head 1A.

Figures 1, 4N:
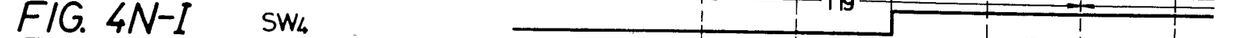
Figures 2, 4N:
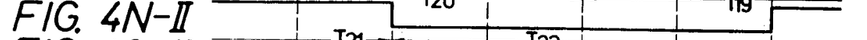

This same processing is performed in relation to the third and fourth rams 21 and 22, in which switching signal $SW_4$, shown in FIG. 4N, inverts its state when the parity word and CRC code generating and adding processing is ended and is fed from control signal generator 14 to switching circuit 30 so that when signal $SW_4$ is high during period $T_{21}$, switching circuit 30 is changed over to connect the output of third RAM 21 and during the time period $T_{22}$ when switching signal $SW_4$ is low, switching circuit 30 is changed over to connect the output of fourth RAM 22. Thus, RAMs 21 and 22 are respectively set in the read mode during periods $T_{21}$ and $T_{22}$ during which, in the manner discussed above relative to the first and second rams 19 and 20, the PCM data are repeatedly read out at a speed slightly higher than two times the speed at which they are written in, as shown in FIGS. 4F and 4G, and this read-out data is supplied through recording processor 32 to head 1B.

Figures 1, 4O, 4R:
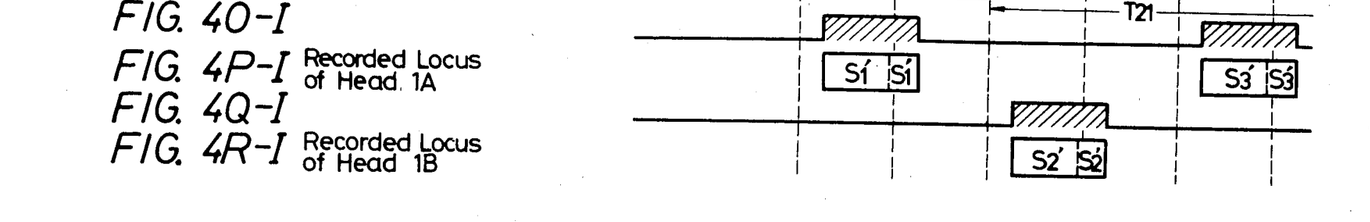
Figures 2, 4O:
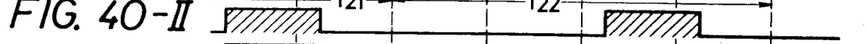
Figures 2, 4P:
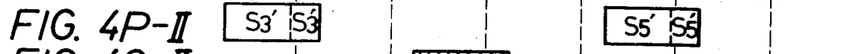
Figures 2, 4Q, 4R:
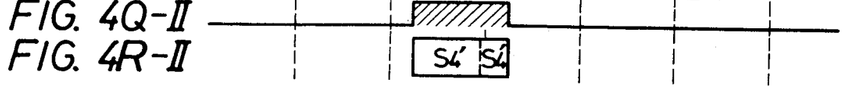

Because rotary heads 1A and 1B are rotated at a constant speed of 30 revolutions per second regardless of the timing signals in the recording system described above, the heads 1A and 1B have an arbitrary phase relationship relative to the data that is read out from the random access memories. Nevertheless, the time-base compressed data $S_1'$, $S_2'$, $S_3'$, . . . that make up one segment are respectively supplied to head 1A or 1B repeatedly over one rotational period so that during the tape contact interval of heads 1A and 1B the signals supplied thereto are recorded on the tape as tracks 4A and 4B, respectively. More specifically, if the tape contact interval between tape 2 and rotary head 1A corresponds to the time period represented by the cross-hatched waveform portion in FIG. 4O, and the contact interval between tape 2 and rotary head 1B corresponds to the time period represented by the cross-hatched waveform portion in FIG. 4Q, it may be seen from FIGS. 4P and 4R that one segment of PCM data is read out from the four RAMs 19, 20, 21, and 22 in different sequential order but will always be recorded in one track. In this case, since the speed of reading is slightly greater than two times the speed of writing, the data of one segment amount is partially overlapped and recorded on one track. As described above, the two-channel amount of data of 1/60 of a second each is recorded after being compressed in time base by approximately one half.

As represented in FIG. 5, in the recording processors 31, 32 one block of data has added thereto a block synchronizing signal SYNC and address data ADS, which consists of a segment address indicating the kind of segment and the block address for its block. Since one block is formed of six words, the number of blocks contained in the data of one segment is calculated as:

1,470(words) ÷ 6 = 245(blocks)

Thus, as represented in FIG. 5, the data is formed of 245 blocks from the first block $B_0$ to the last block $B_{244}$.

Recording processors 31, 32 operate to modulate the PCM data to a signal suitable for recording, for example, by reducing any DC component in the data signals as much as possible before recording.

Figure 7A:
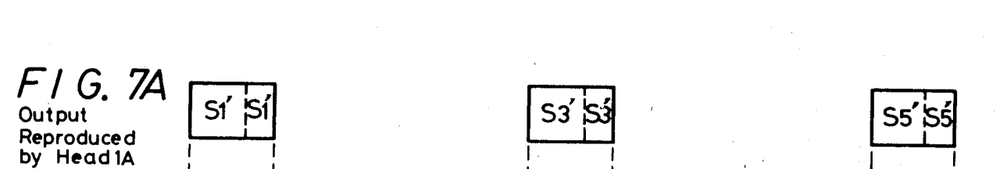
Figures 7B, 7C:
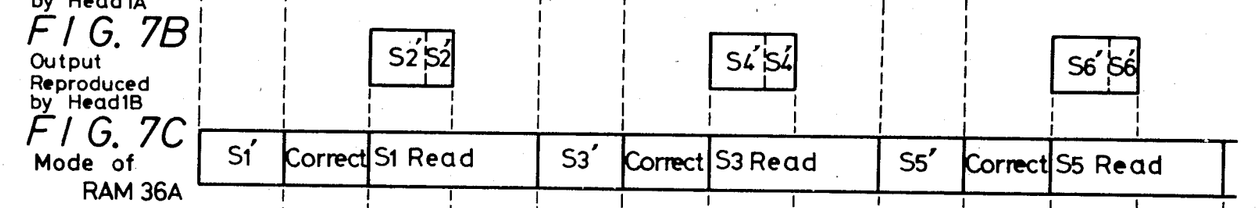
Figures 7D, 7E:
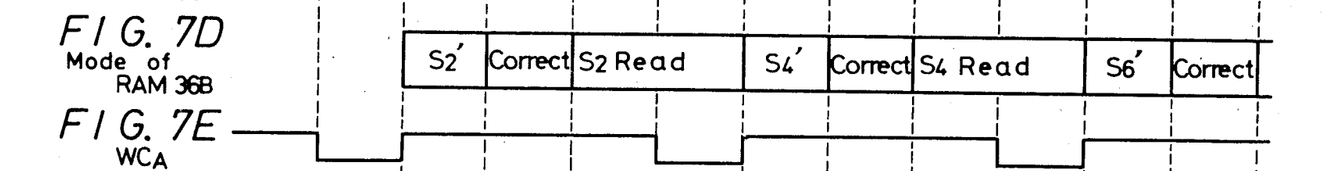

Turning now to FIG. 6 a system suitable for reproducing the signals as might have been recorded by means of the present invention is shown. It is to be understood that heads 1A and 1B are controlled by a tracking servo so that they correctly trace the recorded tracks 4A and 4B and since various tracking-servo methods are known it is not necessary to show such systems and, thus, they do not form a part of the present invention. Accordingly, upon playback an output signal, as represented in FIG. 7A, is provided by aligning head 1A to trace track 4A and a similar output signal, as represented in FIG. 7B, is provided by causing head 1B to trace track 4B. These two output signals from magnetic heads 1A and 1B, respectively, are fed through amplifiers 33A and 33B to digital signal restoring circuits 34A and 34B, respectively, wherein they are reconverted to digital signals having levels of 0 or 1 and then fed to error detection and RAM write control signal generating circuits 35A and 35B, respectively. Circuits 35A and 35B serve to provide error detection by utilizing the parity words P and Q and the CRC codes and the synchronizing signal SYNC and address data ADS at each block are employed to generate a write address and write timing signal for two random access memory (RAM) units 36A and 36B. Specifically, once the write address and write timing signals are obtained from the error detection and RAM write control circuits 35A and 35B, the block data is written into RAMs 36A and 36B at the specified addresses through the action of switching circuits 37A and 37B, respectively. The result of this switching operation based upon the appropriate addresses and SYNC signals is to cause the one segment of data recorded on one track in an irregular order to be written into RAMs 36A and 36B at the specified addresses, as represented in FIGS. 7C and 7D.

Figures 7F, 7G, 7H:
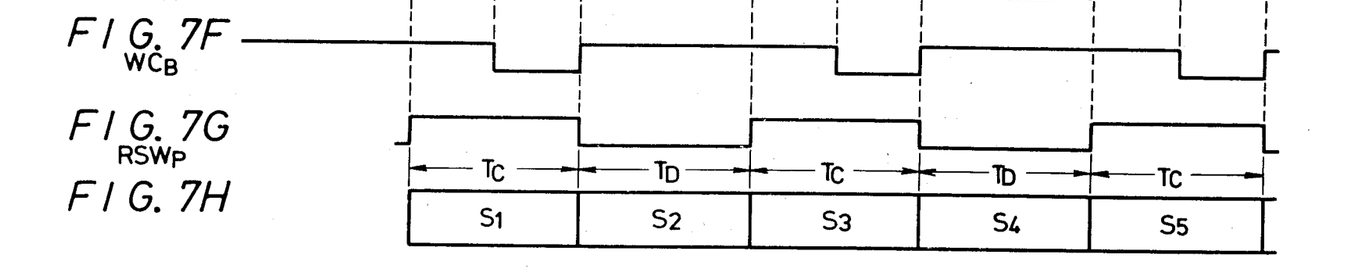

Once all of the data in one segment have been written into RAMs 36A and 36B, each RAM then provides an end signal, and each end signal is provided by adding the write timing signals generated at every block of data. The end signals are respectively supplied to a control signal generating circuit 38, which is also supplied with a clock signal from master clock signal generator 39, so that control signals for this reproducing system shown in FIG. 6 can be derived therefrom on the basis of the above-described end signals. More specifically, when the end signals are supplied from RAMs 36A and 36B, a first control signal $WC_A$, shown in FIG. 7E, and a second control signal $WC_B$, shown in FIGS. 7F, are produced by control signal generator 38 and have waveforms such that the signals remain low for a 1/120 of a second duration from that point. During the low level period of 1/120 of a second of these control signals, switching circuits 37A and 37B are controlled by control signals $WC_A$ and $WC_B$, respectively, that are changed to opposite states from those shown in the appropriate figure. During this period, the data written into RAMs 36A and 36B are fed respectively to corresponding correction circuits 40A and 40B, in which the data having had errors detected therein are corrected by use of the parity words P and Q and the CRC code. Once such data has been error corrected it is then rewritten back into RAMs 36A and 36B.

Data that has been error corrected as described above and rewritten into RAMs 36A and 36B are then read out with the time bases thereof expanded by a factor of two, in response to a read control signal generated by control signal generator 38. More specifically, switching circuit 41 has an input connected to the output of both RAMs 36A and 36B, respectively, and is changed over to be connected to RAM 36A in response to a control signal $RSW_P$ from control signal generator 38, having a high level during period $T_C$. Similarly, switching circuit 41 is changed over to be connected with RAM 36B when control signal $RSW_P$ has a low level during period $T_D$. The result of this is that either RAMs 36A and 36B, which up to that time has not been in the write mode, is always set in the read mode so that during the period $T_C$ the data is read out from RAM 36A or during the period $T_D$ the data is read out from RAM 36B.

At that time the data words that were dispersed in the one segment by the interleaving processing that occurred during recording are now de-interleaved because the write address to RAMs 36A and 36B are controlled upon reproduction so that the data read out therefrom can be returned to the data words formed in the original order. This example of control of the write addresses is only one of the ways in which de-interleaving may be accomplished.

The data thus read out are selectively extracted by switching circuit 41, as shown in FIGS. 7H. This read out data is then fed to error concealing circuit 42, which acts to conceal those errors that could not be fully corrected in error correcting circuits 40A and 40B. Error concealing circuits are well known and may consist of prevalue holding systems so that any errors are statistically concealed.

The output signal of error concealing circuit 42 consists of left-channel and right-channel audio data that alternately appear at each word. This output signal is reconverted to the original analog signal in digital-to-analog (D/A) convertor 43, and the reconverted analog signal is fed to switching circuit 44, which is alternately changed over in position to one or the other of two output terminals in response to a switching control signal $SW_P$, and in this embodiment signal $SW_p$ has a frequency of 44.1 kHz, which is identical to the frequency of switching signal $SW_1$ that was used in recording. In this fashion, the left-channel and right-channel audio signals are fed through amplifiers 45L and 45R to output terminals 46L and 46R that comprise the reproduced outputs, respectively.

The operational states of RAMs 36A and 36B during reproducing are shown by the timing signals in FIGS. 7C and 7D, respectively.

The pulse-code-modulated signal whose time base has been compressed to a duration corresponding to the tape contact interval between the rotary head and the tape can be recorded in accordance with the above so that it can be reproduced even if the rotational phase of the rotary head is not synchronized with the recording signal. Nevertheless, since in the illustrative example above, the rotational phase of the rotary head can be entirely arbitrary relative to the recording signal, it would appear that the rotary head 1A, for example, would contact the tape during a time overlapping periods $T_{19}$ and $T_{20}$ as seen in FIG. 4. If so, signals of different unit period amount, for example, $S_1$ and $S_2$, are recorded on one record track so that it would seem that a problem would arise in the interleave processing of one segment unit, in the parity data generation and the like. Nevertheless, even in such case, if upon recording the address data of each unit period amount, that is, the address of each segment, is added to the data in addition to the address of each block as described above, then during reproduction such data can be satisfactorily reproduced by providing two individual random access memory units for each recording or reproduction head. In such case, a signal indicating the end of each segment is inserted at the beginning or end of one segment of data.

Furthermore, a feature of the present invention is that even when the rotational phase of the rotary head is not accurately known, unlike the phase detection signal for a rotary head as described hereinabove, if when the tape is stopped the signal is recorded by the head at a certain rotational period, and such recorded signal is then reproduced during the succeeding rotational period and the reproduced signal envelope-detected, the time at which the head starts to contact the tape can be roughly detected by the output, and the detected signal supplied to the control signal generator by which the phase of the control signal can be controlled in advance. Thus, the recording timing of the recording signal can be determined relative to the rotational phase of the rotary head in such a way that the pulse-code-modulated data of one segment can be recorded in one track. Also, since the rotational phase of the rotary head is known to a certain extent by the phase of the drive signal that is supplied to the motor for driving the rotary head, the above recording timing can be controlled by the detected phase of the drive signal.

A further advantage is provided by the embodiment of the present invention as described, since the PCM data of one segment is time-base compressed to a duration just slightly short of any tape contact interval with the head and is then recorded, the data of one segment is recorded on the corresponding one track as partially overlapped, thus preventing drop-outs.

Various specifics of the embodiments described above should not be viewed as limiting factors to the present invention. For example, when recording can be performed with a guard band between tracks 4A and 4B, it is not necessary to have different azimuth gap angles of heads 1A and 1B. Moreover, the number of rotary heads need not be limited to two but can be as few as one or can exceed two. Furthermore, the present invention is not limited to an information signal that comprises a left and right audio PCM signal but can be any information signal, such as a video signal or the like.

As can be seen from the above, the present invention provides a method and apparatus where a PCM signal having a compressed time base can be recorded with no adverse effects by a rotary head having any desired rotational phase relative to the recording signal upon reproduction. Accordingly, the pulse generator that was indispensable in the prior art systems in order to generate the signal indicating the rotational phase of the rotary head is not required. Thus, the requirement to provide the pulse generator within the drum of the rotary head assembly is no longer present, and the diameter of the tape guide drum can be made smaller. Moreover, according to the present invention, the construction of the drum can be simplified and the rotary head can be manufactured at a correspondingly lower cost. Also, by eliminating the requirement for the pulse generator, the troublesome and burdensome task of adjusting the head mounting position and the position of the pulse generator is eliminated.

Although illustrative embodiments of the present invention have been described in detail above with reference to the accompanying drawings, it is to be understood that the invention is not limited to those precise embodiments and that various changes and modifications and variations can be effected therein by one skilled in the art without departing from the spirit and scope of the invention, as defined by the appended claims.

What is claimed is:

1. A method of recording an analog signal on a magnetic medium using a recording head that periodically scans the magnetic medium in discrete traces, the method comprising the steps of:
providing a digital signal corresponding to a predetermined real-time signal period of the analog signal;
scanning said magnetic medium with the recording head during at least one recording period corresponding to each predetermined real-time signal period, said at least one recording period being shorter than said real-time signal period;
adding additional data periodically to said digital signal to provide a composite digital signal;
time-base compressing said composite digital signal to a period less than said recording period; and
supplying said time-base compressed composite signal to the head more than once in each recording period for redundantly recording said composite signal on the magnetic medium during a recording period, whereby a reproduction of the complete composite signal from the magnetic medium is obtainable without controlling the phase relation between the recording head and the magnetic medium during the recording.

2. A method of recording an analog signal according to claim 1, in which two diametrically opposed recording heads are provided and including the further step of guiding the magnetic medium into contact with said equally spaced recording heads over an arc of 90°.

3. A method of recording an analog signal according to claim 1, in which the analog signal is provided in two separate channels simultaneously and two recording heads are used; and in which said digital signal comprises a single pulse-code-modulated (PCM) signal representing both of the channels of the analog signal.

4. A method of recording an analog signal according to claim 3, in which said step of adding additional data periodically includes the step of adding parity data and a cyclic redundancy check code.

5. A method of recording an analog signal according to claim 4, in which the step of time-base compressing said composite digital signal includes the steps of writing said PCM signal into different memory means during alternating real-time signal periods of the analog signal and reading out data written into said memory means at a rate higher than that in which they where written in.

6. A method of recording an analog signal according to claim 4, including the step of recording said composite digital signal on the magnetic medium, data corresponding to said separate channels being recorded in alternate tracks, respectively.

7. A method of recording an analog signal according to claim 4, including the further steps of forming said time-base compressed composite digital signal into blocks, providing address data corresponding to said blocks, and adding said address data to said composite signal prior to recording.

8. A method of recording an analog signal according to claim 4, in which the step of supplying said time-base compressed composite signal includes the step of supplying said time-base compressed composite signal at least twice during each recording period.

9. Apparatus for recording an analog signal on a magnetic medium using a recording head that periodically scans the magnetic medium over a recording period, the apparatus comprising:
converting means for converting said analog signal, during successive predetermined real-time signal periods thereof, into a corresponding digital signal, said real-time period being greater than said recording period;
guide means for guiding the magnetic medium past the recording head;
digital data generating means for supplying and adding additional digital data to said digital signal to form a composite signal;
time-base compressing means for time-base compressing said composite digital signal into periods slightly less than said recording period; and
read-out means for supplying said time-base compressed composite signal to the head more than once during a recording period for redundantly recording said composite signal on the magnetic medium, whereby a reproduction of the complete composite signal is obtainable from the magnetic medium without controlling the phase relation between the recording head and the magnetic medium during the recording.

10. Apparatus according to claim 9, in which said time-base compressing means includes memory means for storing said composite digital signal and time-base compressing said digital signal by reading out said digital signal at a rate greater than a rate at which it was written in, and said read-out means is connected to said memory means for reading out said digital signal stored in said memory means more than once during each recording period.

11. Apparatus according to claim 10, in which said magnetic medium is in the form of a tape and said recording head includes at least two diametrically opposed magnetic heads arranged for rotation thereby to define a recording period corresponding to the period of rotation of the heads and to provide a series of tracks on said tape; and
said guide means includes means for guiding the tape past said rotating heads through an arc substantially equal to 90°.

12. Apparatus for recording an analog signal according to claim 11, in which said two recording heads are connected for recording an analog signal provided in two separate channels; said converting means includes means for providing a pulse-code-modulated (PCM) signal representing both of the channels of the analog signal; and said data generating means includes means for generating parity data and cyclic redundancy check codes for addition to said PCM signal.

13. Apparatus for recording an analog signal, according to claim 12, in which said time-base compressing means includes memory means for storing and time-base compressing said composite digital signal to a period having a duration of one-half said recording period.

14. Apparatus for recording an analog signal according to claim 13, in which said memory means includes first and second pairs of random access memory units for receiving the PCM signals corresponding to alternating real-time signal periods in each of said two channels.

15. Apparatus for recording an analog signal according to claim 14, further comprising processing means for receiving said time-base compressed composite digital signal and adding thereto supplementary digital data at the beginning and ends thereof prior to recording on said magnetic medium.

16. Apparatus for recording an analog signal according to claim 15, in which said processing means includes means for adding synchronization data and address data as said supplementary digital data.

* * * * *